United States Patent [19]
Radford et al.

[11] Patent Number: 4,756,243
[45] Date of Patent: Jul. 12, 1988

[54] CONTINUOUS COAGULATOR

[75] Inventors: David R. Radford, Black Rock; Norman H. Freeman, Moorabbin; Graeme W. Jameson, Kew; Hendrikus J. van Leeuwen, Emerald; Brian J. Sutherland, Springvale South, all of Australia

[73] Assignee: Commonwealth Scientific and Industrial Research Organization, Australia

[21] Appl. No.: 800,261

[22] PCT Filed: Mar. 1, 1985

[86] PCT No.: PCT/AU85/00034
§ 371 Date: Nov. 6, 1985
§ 102(e) Date: Nov. 6, 1985

[87] PCT Pub. No.: WO85/03844
PCT Pub. Date: Sep. 12, 1985

[30] Foreign Application Priority Data
Mar. 6, 1984 [AU] Australia .............. PG3925

[51] Int. Cl.⁴ .............................................. A23C 19/02
[52] U.S. Cl. ......................................... 99/453; 99/452; 99/458
[58] Field of Search .................... 99/452–455, 99/461, 458, 465, 467, 470; 426/36, 40, 516, 582, 491

[56] References Cited
U.S. PATENT DOCUMENTS
4,224,865 9/1980 Grosclaude et al. ............... 99/453

FOREIGN PATENT DOCUMENTS
0065394 11/1982 European Pat. Off. .
1582982 8/1970 Fed. Rep. of Germany .
1582979 12/1970 Fed. Rep. of Germany .
2501854 7/1976 Fed. Rep. of Germany .
2516356 11/1981 France .
1206011 12/1967 United Kingdom .
1096175 9/1970 United Kingdom .

OTHER PUBLICATIONS
"Disclosure of the Basic Principles of the Multitube Process for the Continuous Production of Curd Pieces," Schulz, M. E. et al., *Milchwissenschaft*, 24, 74 (1969).

Primary Examiner—Timothy F. Simone
Attorney, Agent, or Firm—Bacon & Thomas

[57] ABSTRACT

An apparatus suitable for use in the substantially continuous production of cheese from milk retentate (A) in which there is at least one, preferably several, coagulator tubes (I) having an inlet end and an outlet end. The retentate is admitted to the tube (I) from a feed system (E) via the inlet, forms a coagulum inside the tube and is discharged from the outlet whereupon it is cut or sliced into appropriately sized pieces, preferably small cubes by a blade assembly (K, L) mounted at or near the outlet. The feed system (E) comprises a distribution manifold for delivering retentate to the inlet or inlets via a valve (G) located between the manifold and tube(s) and a pump (F) for circulating the retentate in the feed system at such a rate that the feed system is substantially free of coagulum.

17 Claims, 8 Drawing Sheets

CONTINUOUS COAGULATOR

This invention relates to a process and apparatus for manufacturing cheese curd substantially continuously and is particularly concerned with the manufacture of cheese curd from rennet-coagulated retentate during the production of hard cheese.

The term "milk" includes, among others, whole milk, low fat milk (part-skim milk), skim milk, reconstituted milk, recombined milk, and whole milk whose composition has been adjusted and similar such materials but is not limited thereto.

The term "retentate" refers to a concentrate of milk obtained by the partial removal from milk of water and water-soluble milk components of low molecular weight, notably lactose and mineral components. The production of retentate is conveniently carried out by a pressure-driven membrane filtration process, for example ultrafiltration (UF).

The term "ripened retentate" usually means retentate in which growth and acid production by lactic acid cheese starter bacteria has proceeded sufficiently to meet requirements of later steps of the process.

BACKGROUND ART

The manufacture of cheese from milk concentrated by ultrafiltration (UF) is a radical innovation in cheesemaking which has been introduced to increase the yield of cheese. The increase in yield is largely due to incorporation into the cheese of soluble proteins, principally $\alpha$-lactalbumin and $\beta$-lactoglobulin. In conventional cheesemaking, these proteins are almost totally lost in the whey.

Historically, cheesemaking processes based on UF were first applied to the manufacture of soft, high-moisture cheeses. The well-known process by which soft cheeses are manufactured from retentate is based on the concentration of whole or skim milk by UF, with the addition of high-fat cream in the latter case, to yield a product ("pre-cheese") containing about 60% moisture and having a gross composition similar to that of the desired cheese. Coagulation and fermentation of the pre-cheese affords the finished cheese directly, with little or no whey drainage or loss of whey proteins. The rennet requirement is reduced by approximately 80%.

The manufacture of hard cheese from retentate presents difficulties much greater than those encountered in the manufacture of soft cheeses. These difficulties derive from the requirements of (i) removing more water from the retentate (typically 60% of moisture in 5:1 concentrated retentate) in hard cheese manufacture than is necessary in soft cheese manufacture in order to achieve the desired composition, while (ii) retaining the sensory attributes of the cheese variety and (iii) simultaneously achieving a sufficiently high yield increase to justify introducing the UF-based process.

Early attempts to develop manufacturing procedures for hard cheeses based on syneresis of rennet-coagulated retentate were characterized by substantial losses of fat and curd fines in the whey, excessive cheese moisture levels, and by poor cheese quality. More significantly, the cheese yield was increased little, if at all.

The difficulties with these early hard cheese manufacturing procedures were overcome and the basic requirements of a process for manufacturing hard cheese of acceptable quality and with satisfactory yield were established.

However, some of the steps and/or operations in this process had to be effected in a batch or semi-continuous fashion since no suitable apparatus was available for continuous processing, especially continuous coagulation.

One attempt at providing a simple apparatus for continuous production of coagulum from retentate is a single tube, continuously fed with a mixture of rennet and ripened retentate, and in which liquid movement takes place as plug flow. Devices based on these principles have been described (e.g. Grosclaude et al, U.S. Pat. Nos. 4,131,688 and 4,224,865). However, experience with a coagulation apparatus of this type showed it to be totally unsatisfactory in practice. Initially, the tube contained a zone of liquid ripened rennetted retentate, a zone in which coagulation was taking place, and a zone filled with coagulum. As time passed, however, coagulum formed and adhered onto the walls of the tube in the liquid-filled zone, and continuously built up and increased in thickness. Eventually, the tube became filled with a stationary annulus of coagulum surrounding a moving column of retentate which had insufficient residence time to coagulate. This experience showed that ripened rennetted retentate cannot be passed slowly through a tube, because of the build-up of coagulum on the walls, and suggested that coagulator designs based on a single tube could not be made to operate satisfactorily in a continuous mode.

It is therefore an object of the present invention to provide an apparatus which at least alleviates some of the problems associated with earlier apparatus for continuous production of hard cheese by providing an apparatus suitable for making hard cheese substantially continuously.

More specifically, the invention, in its preferred form, seeks to alleviate some of these problems by attempting to maximize the yield increase (and in particular to minimize fat and curd fines losses) and to ensure that the curd produced is suitable for further treatment in existing post-vat cheesemaking equipment and processes (e.g. Cheddaring, milling, salting, pressing in typical Cheddar cheese manufacture).

According to the present invention, there is provided an apparatus for the substantially continuous production of cheese from milk retentate, said apparatus comprising at least one coagulator tube having an inlet at one end for periodically receiving ripened rennetted retentate and an outlet at the other end for discharging coagulum formed in the tube said discharge being effected by pressure applied to, at or adjacent the inlet end, which is connected to a feed system comprising distribution means and circulation means, wherein said circulation means provides circulation of the retentate through the feed system under conditions whereby coagulation of the retentate is substantially prevented, and wherein the distribution means includes valve means arranged to periodically admit the retentate into the inlet of the tube from the distribution means. Typically there are two or more coagulator tubes; preferably 3, 4, 5, 6 or more similar such tubes.

Preferably, the feed system comprises a conduit in the form of a endless loop of closed piping or the like, which incorporates, as part of the loop, the distribution means and circulation means. One form of the distribution means is a manifold means which forms a part of the endless loop. However, the system may comprise, or include as part of the loop, one or more vessels, chambers or like reservoirs in fluid communication with the coagulator tube or tubes.

Preferably, the circulation means comprises a pump arranged for pumping the retentate at a sufficient velocity to prevent coagulum forming on the walls of the feed system or distribution means. Stirring or other agitation means may also be provided, if necessary or desired, particularly if any form of reservoir is included in the system.

Preferably, a separate pump, externally located to the feed system, provides within the distribution means the pressure required to effect injection of the retentate into the inlet(s) of the coagulator tube(s) and thereby to effect displacement of the coagulum that has formed in the tube from the previous injection of ripened rennetted retentate.

Preferably, there is a plurality of coagulation tubes, each of which are connected to the distribution means.

Preferably, the or all of the coagulation tube(s) are inclined at an angle to the horizontal. However, any orientation of the tubes relative to the remainder of the apparatus and/or to the floor of the factory in which it is located may be used.

Preferably, there is a cutting assembly located at or adjacent the outlet or outlets for cutting the coagulum into appropriately sized pieces, usually cubes or cuboids of about 1cm$^3$, as or after it emerges from the coagulation tube(s). Most conveniently this can be done in two stages by providing slicing means located at or near the outlet(s) of the coagulator tube(s), to slice the coagulum longitudinally into substantially square section strands, and cutting means located adjacent the slicing means to cut the coagulum strands substantially transversely to form cubes.

The present invention thus provides an apparatus for the substantially continuous production of cheese curd suitable for subsequent manufacture into hard cheese (such as Cheddar or related types) with minimal losses of milk solids in any form. More particularly, the apparatus of the present invention is suited to the coagulation and cutting of ripened retentate as required by the process described in Australian Patent Application No. PF 6207/82.

The design of the apparatus of the present invention generally includes consideration of the following steps and operations during the process of making hard cheese from retentate.

(1) Mixing of ripened retentate with rennet in a suitable amount at a temperature approximating the desired coagulation temperature, with sufficient agitation to ensure thorough mixing.

(2) Keeping the thus ripened rennetted retentate vigorously agitated in the distribution means, preferably the endless closed loop, with sufficient agitation so the closed loop is substantially free of coagulum. The mean residence time of the ripened rennetted retentate in the distribution means being sufficiently short that it has no adverse affect on losses of fat and curd fines in subsequent cheesemaking. The function of the distribution means is to hold the ripened rennetted retentate preparatory to its distribution to the coagulator tube(s) in a defined sequence.

In an alternative procedure, steps (1) and (2) may be combined ie. mixing of rennet, fermented retentate (as defined in Australian Patent Application PF 6207/82) and fresh retentate may take place in the vigorously agitated chamber.

In the preferred embodiment of the apparatus, the ripened rennetted retentate is transferred from the distribution means to a plurality of coagulator tubes. Transfer takes place to one or some of the total number of tubes at a time, and the tube(s) may be fractionally ($\frac{1}{2}$, $\frac{1}{3}$, $\frac{1}{4}$, 1/5, etc.) or completely filled in a given filling operation. The portion of tube filled in such a filling operation is termed a "segment" and the time taken is termed the "segment filling time".

The tubes should preferably be maintained at or near the desired coagulation temperature, such as for example up to ±10° C. of the coagulation temperature of the coagulum. The coagulation tubes may be divided into two or more zones, each zone at the same or at different temperatures. There may be a temperature difference, such as a gradual temperature gradient, between the inlet and outlet end of the tubes. One way of maintaining the tubes at the desired temperature is to have the tubes surrounded by water jackets for receiving continuously circulated water at a selected and/or predetermined temperature.

The tubes are filled in a defined sequence. Transfer of the liquid feedstock occurs under pressure via piping and inlet valves, forming part of the feed system, located at the base of each tube. The piping, and as far as possible the valves, are arranged so that the ripened rennetted retentate they contain can be kept vigorously agitated, as required in (2) above.

Factors affecting Coagulator Tube Design

Design of the coagulator and development of the operating procedure have all been based upon criteria of optimising cheese quality and minimising losses of fat and curd fines in the whey.

The tubes may be arranged vertically, horizontally or inclined and may be straight or curved in form.

Straight tubes are preferred as this minimizes disruptive forces on the coagulum. Small-radius bends in the tubes are unacceptable, particularly if around 90° or more. However, gentle curves are acceptable.

It is preferable to operate the transverse cutting means in or near to a vertical plane so as to facilitate clearance of cut particles from the face of the cut coagulum. Otherwise, the cut particles may tend to adhere to one another and/or to the coagulum face. Vertical straight tubes thus have a disadvantage and while horizontal tubes might thus appear preferable, they present other difficulties, especially in initial filling.

A useful design compromise is to have the tubes at an angle, for example 10°–50°, to the horizontal, and to have a bend of the same angle in the upper part of each tube. A relatively small bend such as this has no measurable disruptive effect on the coagulum, and the arrangement permits transverse cutting in a vertical plane.

The length to diameter ratio (L/D) of the coagulator tube is generally related to the displacement within the coagulation tube of a segment of partially coagulated retentate by incoming liquid rennetted retentate. The factors which affect the preferred L/D range include:

(a) Segment sealing—excessively short segments (low L/D) may tend to distort and allow the incoming liquid retentate to leak past the partially coagulated segment which is being displaced.

(b) Loss of plug flow—at very low L/D the partially coagulated segment may become quite unstable and may tilt or rotate within the tube. Also bulging of the segment centre can occur due to a combination of the pressure applied via the incoming retentate (or other means) and the frictional drag between the tube walls and the moving segment of coagulum. This may result in the extrusion of insufficiently coagulated retentate.
(c) Back pressure—with high L/D values excessive pressures may need to be applied via the incoming rennetted retentate to displace the coagulating segment.
(d) Frictional drag—with high L/D the consequent surface area/volume ratio may result in excessive frictional drag between the tube walls and the moving segment of partially coagulated retentate. This drag could result in disturbance of the coagulum, especially in the outer regions of the segment cross-section.
(e) Cutting rate—high L/D values may result in high linear velocity of coagulum issuing from the coagulation tube. In turn, this requires a high speed cutting operation, leading to the application of excessive forces to the coagulum.

Taking all these factors into account, the maximum useful range of L/D is about 1–100, preferably 2–50, more preferably 4–20.

Factors affecting Curd Cutter Design

Application of excessive deforming forces to the coagulum before cutting or during the period immediately after cutting causes increased losses of milk fat. A typical illustration of the relationship between fat lost from curd into the whey and disruption of coagulum structure is shown by the following experiments:
(a) Quantities of 10 mm cubes of coagulum were agitated in drums of different diameters after cutting and then made into cheese. Drum diameters of 0.75 m and 1.2 m respectively were used and the levels of fat observed in the respective whey samples were 2.3 and 4.8% respectively.
(b) Passage of coagulum around a sharp 90° bend caused increased losses of fat in whey relative to a control (7.0% as compared to 4.6%).

The following factors need to be taken into account, therefore, when considering the design of curd cutting assemblies.

The preferred curd particle shape is cubic. This is the shape most resistant to damage caused by transfer to and tumbling in the syneresis drum. Approximations to a cubic shape are acceptable, but it is less preferred that the cutter produce curd particles which are excessively elongated in any dimension, or produce excessive quantities of very small particles. Very small particles have a high surface area/volume ratio and lose excessive amounts of fat. Particles which are excessively elongated in any dimension are prone to breakage in the elongated area creating quantities of very small particles and causing substantial losses of fat from the ruptured surfaces.

Curd particles cut from the outer curved surface of a cylindrical column of coagulum by the cutting assembly will not be cubic. Of necessity therefore, a number of small particles are produced. Thus, there is an advantage in using tubes with a large diameter, which result in the production of proportionately less fine particles in cutting and proportionately more substantially cubic or cuboid particles.

In the preferred form of cutting assembly, the longitudinal slicing means comprises a grid of blades or wires through which the coagulum is forced as it emerges from the coagulator tube. The traverse cutting means comprises one or more rotating or oscillating blades or wires.

Figure 8:
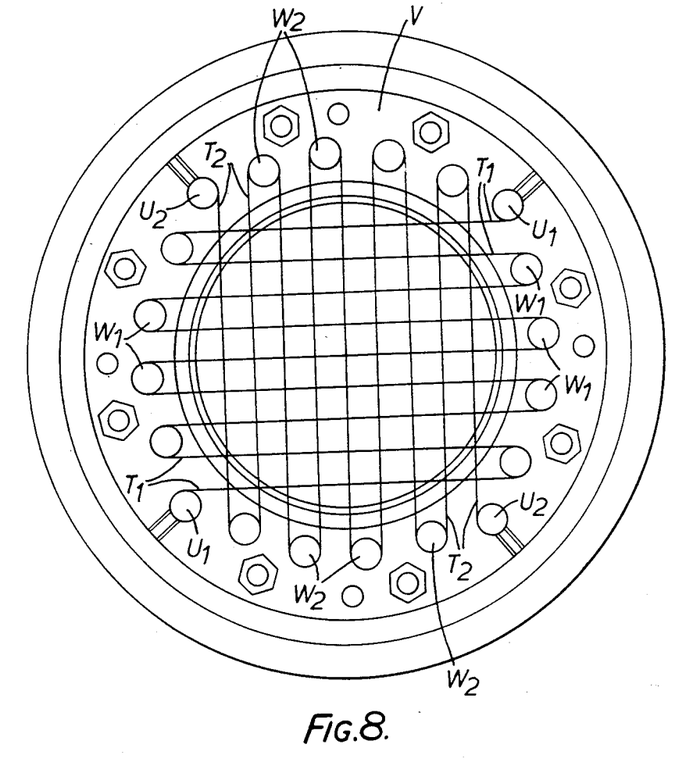
FIG. 8 is a plan view of one form of slicing grid used in the apparatus.

The important design criteria for the slicing means are to minimize compression and distortion of the coagulum and to support the coagulum while it is being cut. Appropriate orientation of the crossed blades of the grid relative to the direction of travel of the transverse cutting means meets this latter requirement. This prevents sagging of the coagulum and ensures regular shapes in the coagulum particles. Compression of the coagulum is minimized by using very thin (0.01 mm thick) stainless steel strip (12–25 mm wide) for the slicing blades. A convenient method of mounting the blades in the form of continuous strips 10 mm apart is shown in FIG. 8 of the accompanying drawings.

Functional slicing grids can also be made using crossed wires.

Design and operating conditions of the transverse cutter may also affect fat losses. Blades should preferably have sharp edges since an unsharpened blade may cause curd shattering. A thin wire may also be used but a thick wire is less preferred. A moderately thick blade such as for example 1.6 mm, champfered on one edge is satisfactory when appropriately sharpened. A typical length for such a blade is 1800 mm. Knife speeds of 30–120 r.p.m. have proved satisfactory, with no noticeable influence of speed on whey fat losses.

Figure 7:
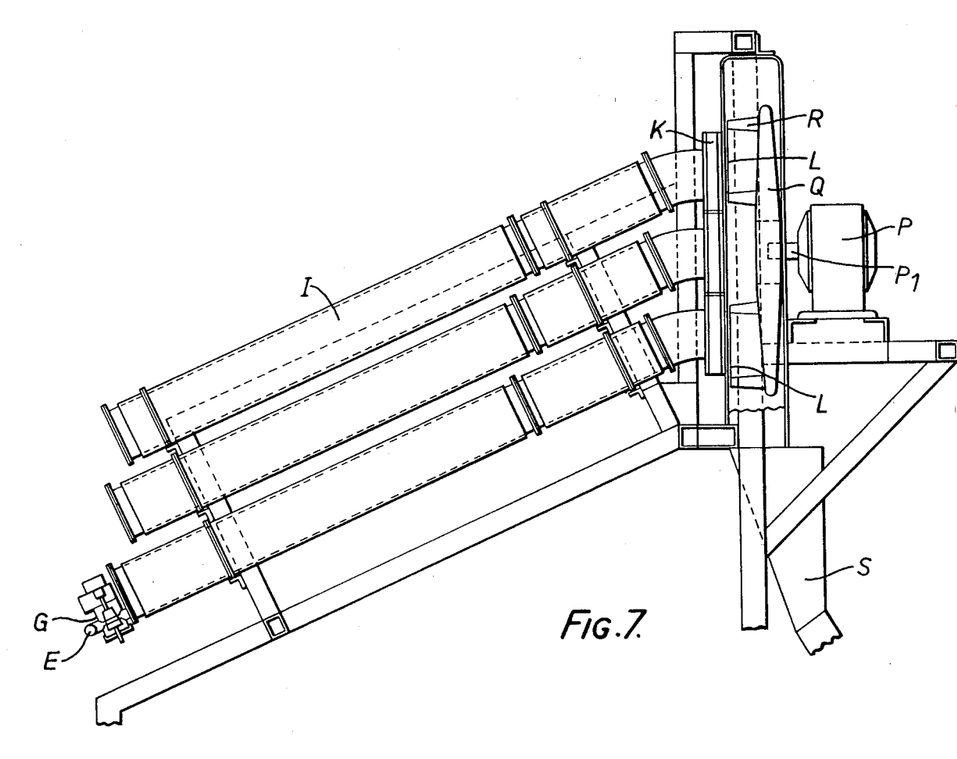
FIG. 7 shows an additional view of the apparatus of FIG. 6.

Any means for supporting and tensioning the transverse cutter should be so shaped and positioned that it does not impact upon curd particles as they fall away from the grid. A support in the form of a disc with support pillars for the knife ends is one form that is satisfactory. An example of a useful design is shown in FIG. 7 of the accompanying drawings.

It is desirable to operate the coagulator at moderate rates of coagulum forward velocity and, hence, at moderate transverse knife radial velocity. Excessive velocities will cause curd damage and fat losses. High transverse knife speeds will provide impacts of the knife on the coagulum with excessive forces. High linear velocities of coagulum within the tube will cause disruption of the structure of the surface region of the coagulum, particularly during the first phase of intermittent movement when the coagulum is still very soft and unstable.

Designs in which the transverse cut takes place within or near a horizontal plane all appear to require a sweeper blade to remove cut coagulum particles from the cutting region before the next stroke of the cutting blade. Performing the transverse cut in or near a vertical plane allows the cut particles to fall away under their own weight. This mode of cutting can be achieved by passing the coagulum in the latter stages of its formation through a bend, and/or by orienting the coagulation tubes in or sufficiently near a horizontal plane. It is also possible to solve the problems associated with carrying out the transverse cut in a horizontal plane by operating at a sufficiently low rate of curd advance. This limits the throughput of the coagulator and therefore represents a less preferred mode of operation.

The coagulum particles obtained after cutting into cubes or cuboids then are suitable for subsequent processing steps required to manufacture Cheddar or similar types of cheese. The first of these steps is syneresis, carried out in one or two rotating drums as specified in the aforementioned Australian Patent Application PF 6207/82.

Processing in these drums is continuous, with entry and exit of materials through opposite open ends. After leaving the syneresis equipment, whey is drained from the curd particles. If, for example, Cheddar-type cheeses are being manufactured, fusion of the curd particles, Cheddaring, milling, salting and pressing can all take place in any existing equipment used for the manufacture of Cheddar-type cheeses.

A typical feedstock for supplying to the apparatus of the present invention is produced as follows:

Whole milk standardized by the addition of cream to yield a casein/fat ratio of 0.67, is pasteurized by heat treatment at 72° C. for 15 seconds at a rate of 30,000 L/h. The pasteurized milk is cooled to 50° C. and subjected to membrane ultrafiltration in a stages-in-series UF plant fitted with Abcor type HFK 130 spiral-wound membranes. Ultrafiltration takes place at 50° C. and with a mean residence time not exceeding 20 min. Diafiltration is carried out concurrently with UF in the last two stages by addition of water at a rate equal to 5% of milk flow rate. Retentate issues from the UF plant at a rate of 6000 L/h and is cooled to 31° C. Some of this is diverted for fermentation. The remainder (5400 L/h) is mixed with previously fermented retentate (600 L/h). The mixture is termed "ripened retentate".

Fermented retentate is made in batches by inoculating 600L portions of retentate with 6 kg of frozen starter concentrate (multiple *Streptococcus cremoris* strains from Mauri Bros. Laboratories, Sydney, Australia). The inoculated retentate portions are fermented at 25° C. until their pH has fallen below 5.7.

Specific embodiments of the apparatus of the invention will now be described with reference to the accompanying drawings, in which.

The various apparatus depicted in FIGS. 1 to 7, differ mainly in the shape and disposition of the coagulation tubes, and in the means adopted for cutting the coagulum and transporting the cut pieces to the syneresis equipment. In some cases, equipment configuration affects operating parameters to a minor degree, eg. the rennet-cut time is a little longer than the most preferred value in Example 4.

In the drawings, like references refer to like parts and the general operating procedure is the same in each embodiment.

Fresh retentate (A) and fermented retentate (B) are produced as described previously, and introduced into the apparatus for mixing to form ripened retentate which is fed to the coagulator tubes by an automatically-controlled, precisely regulated variable-speed positive displacement feed pump (C). In the Examples the feed rate of the resulting ripened retentate is 100L/min. It has a pH of 6.45 and a temperature of 31° C. Diluted rennet is prepared by diluting standard strength rennet (eg. Hansens, 1:8,900) to 1/5 strength with chilled water and maintaining it at about 0°-2° C. The diluted rennet (D) is introduced into the apparatus by a suitable metering pump at 30L/h and mixed with the stream of ripened retentate from the feed pump in preparation for feeding to the coagulator tubes. A static mixer may optionally be incorporated in the line downstream from the rennet addition and/or at the feed pump inlet in order to improve mixing. If pipe runs are short and of sufficiently low volume, the static mixers are unnecessary. In the Examples, all feed pipes are 38 mm diameter.

The ripened rennetted retentate then enters the endless loop acting as a holding/distribution loop (E), in which it is rapidly circulated by the centrifugal pump (F). Total loop volume (including pump chamber, tees etc.) is typically about 5.0L, and the linear liquid velocity in the loop is at least about 0.1 m/s, preferably about 1.0 m/s. The loop is provided with a drain valve (H) to facilitate cleaning.

In all the Examples, 6 coagulation columns (I) with 2 segments/column are used. This enables the process to be operated near preferred values of the coagulation parameters. The columns are 2.77 metres long and have a diameter of 350 mm. The L/D ratio is thus 7.77:1, and the tube volume is such that the segment filling time is 1.33 minutes. The forms of apparatus described in the Examples represent commercial scale plants. On a pilot scale the apparatus of FIGS. 7 and 8 with coagulation columns having an L/D ratio of about 13:1 have been successfully operated.

Discharge of retentate from the loop E to one coagulation column at a time is controlled by the valves (G). These valves are designed and fitted so that dead volume on both sides is minimized. On the loop side of the valves this ensures that coagulum does not build up at the valve entrance. The valves are operated automatically, in a fixed sequence. The columns are numbered 1-6 and the feed valves have corresponding numbers (G1-G6). A suitable operating protocol is:

| Time from start (min) | Operation |
| --- | --- |
| 0 | Pump C on |
| | Pump F on |
| | Valve H closed |
| | Valve G1 open |
| 1.33 | Valve G1 closes |
| | Valve G2 opens |
| 2.67 | Valve G2 closes |
| | Valve G3 opens |
| 4.00 | Valve G3 closes |
| | Valve G4 opens |
| 5.33 | Valve G4 closes |
| | Valve G5 opens |
| 6.67 | Valve G5 closes |
| | Valve G6 opens |
| 8.00 | Valve G6 closes |
| | Valve G1 opens |

The valve operating sequence 0-8.00 min is repeated continuously for the duration of a production run. Shutdown is achieved by substituting water as the feedstock to expel coagulum already forming in the columns. When all coagulum has been removed the system can be drained via valve H and washed by standard dairy factory procedures.

When retentate reaches the tops of the columns in a sufficiently coagulated condition, it is extruded through the cutter grid (K) which slices it into 10 mm × 10 mm columns. The cutters, in one embodiment, comprise a first set of a plurality of flat strips of metal aligned substantially parallel to each other in spaced apart relationship and a second set of similar strips of metal aligned substantially parallel to each other in spaced apart relationship, but aligned at right angles to the first set and each set is slightly spaced apart from each other. The two sets define a cutting grid when viewed in plan. The coagulum is thus first cut into 10 mm × 10 mm strands by passage through the grid and then reduced to 10 mm×10 mm×10 mm cubes by the action of the transverse cutting blade (L). The cubes of coagulum then pass to the syneresis unit (N). The blades (L) are made from flat strips of metal having a substantial width compared to their thickness.

Details of features of the different forms of the apparatus and differences between them are considered in the following Examples.

Figure 1:
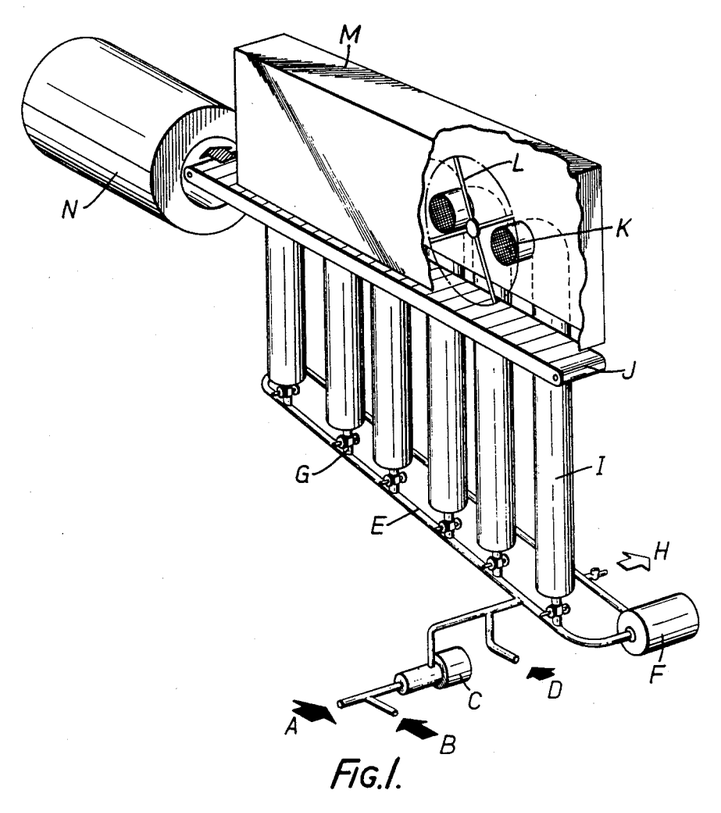
FIGS. 1-6 show partially cut-away perspective views of six forms of coagulating apparatus according to the invention.

EXAMPLE 1 (FIG. 1)

The upper portions of the coagulator tubes are bent through 90°. Coagulum travels around the bend immediately prior to emerging from the coagulator tube. Positioning the bend in the uppermost section of the tube ensures minimum losses of fat and fines in cheesemaking.

Upright coagulator tubes are convenient in operation, and require minimal floor space. Passage of the coagulum around a bend allows it to be cut in a vertical plane by the continuously rotating transverse knife. Coagulum particles are transported to the syneresis drum (N) by the endless conveyor belt (J).

Figure 2:
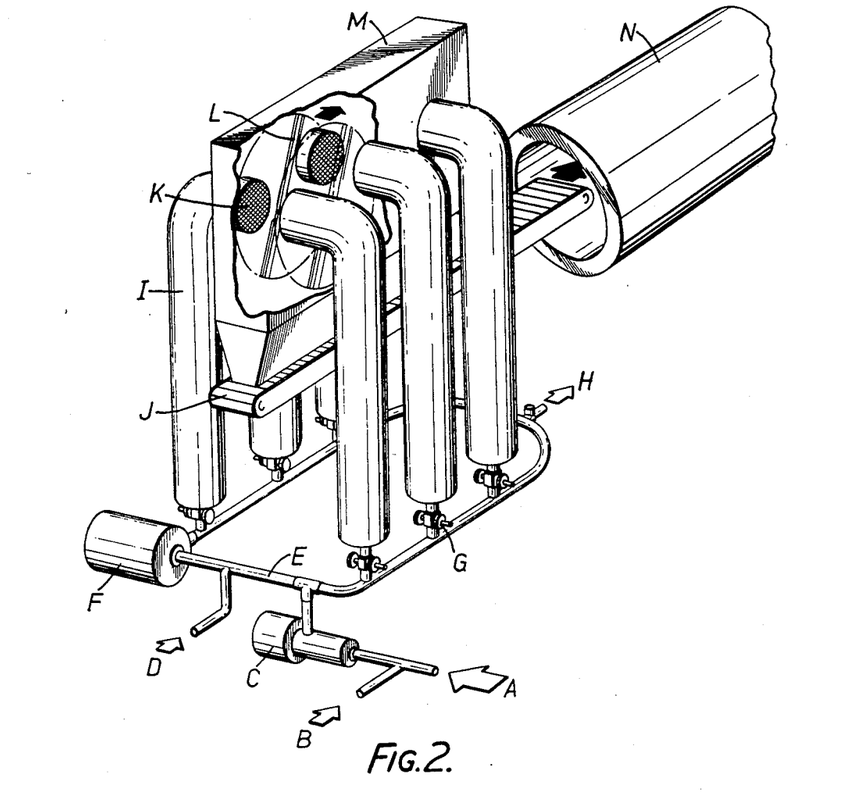

EXAMPLE 2 (FIG. 2)

Similar to Example 1, but a more compact arrangement in which the coagulator tubes are arranged in opposed pairs, and the inlet D for the diluted rennet is introduced directly into the holding/distribution loop (E).

Figure 3:
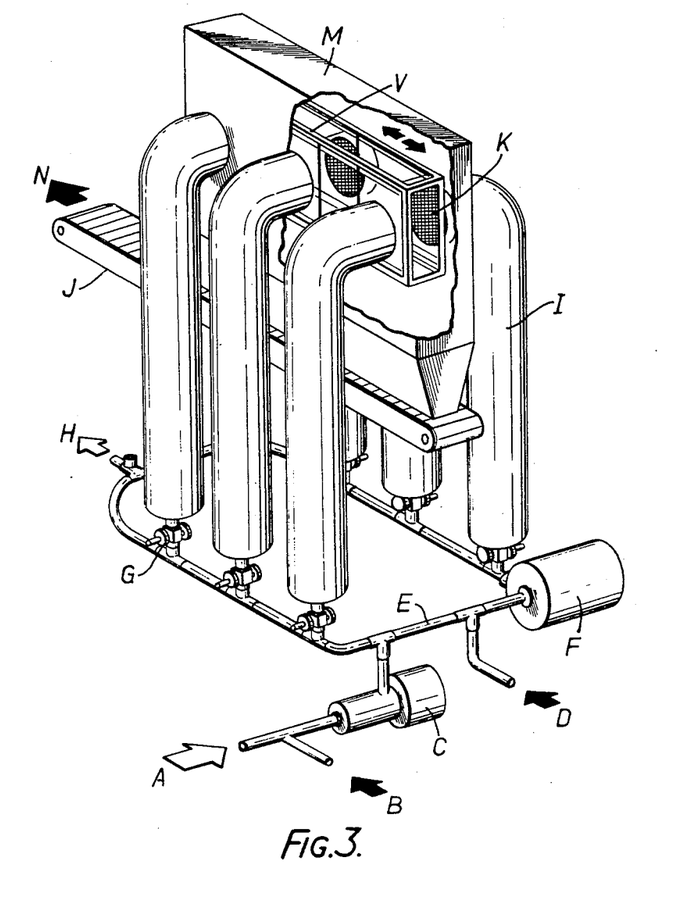

EXAMPLE 3 (FIG. 3)

Similar to Example 2, but differing in that the transverse cut is performed by an oscillating knife (K) instead of a rotating one.

Figure 4:
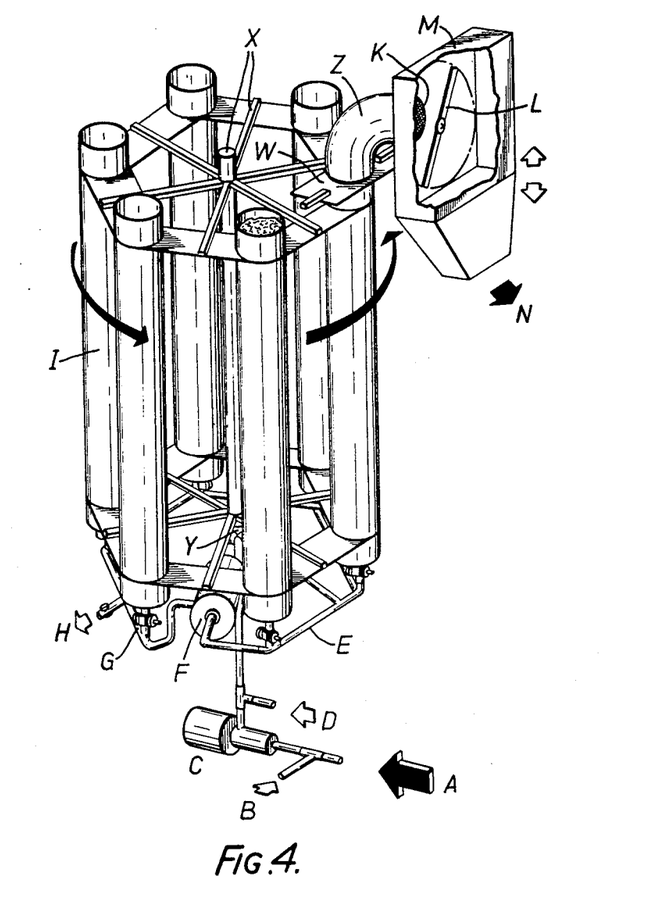

EXAMPLE 4 (FIG. 4)

The feed comprising fresh retentate (A) and fermented retentate (B) upstream of pump (C) and diluted rennet (D) downstream of pump (C) passes through a rotary coupling (Y), on its way to the holding/distribution loop (E). The columns (I), loop (E), circulation pump (F) and valves (G) all rotate as a unit in the direction indicated by the arrows, supported by frame (X) as shown. The valve activation and pump drive are hydraulic.

On extrusion from the coagulator tubes which are straight, the coagulum passes into the transfer section (Z) which is a 90° elbow tube, thereby displacing coagulum from the previous columns still remaining in the elbow and forcing it through the cutter. When the segment of coagulum has been fully extruded from the column, the feed is briefly interrupted (for 6 sec.), the retaining slide (W) moves across to prevent coagulum falling out from the transfer section, and the entire unit rotates around by one tube position. The slide is then removed, feed resumed, and extrusion of coagulum through the cutter continues. During the rotary indexing motion of the tubes, the cutting unit (ie. transfer piece, grid, transverse cutter etc. Z, L, K, W, M) moves initially up (to allow tube motion), and then down (to re-seal to the next tube).

Figure 5:
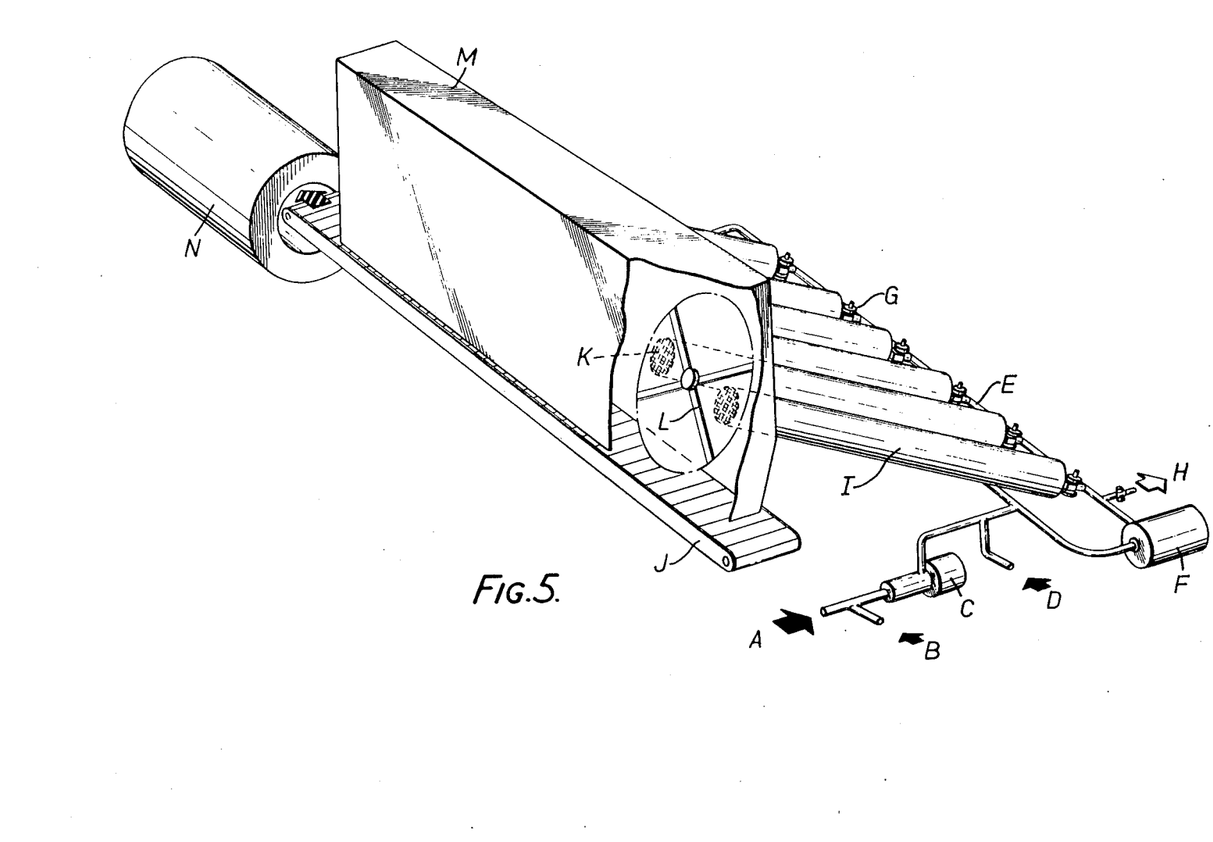

EXAMPLE 5 (FIG. 5)

Similar to Example 1 except that the tubes are inclined at 20° or thereabouts to the horizontal. This obviates the need for bends in the coagulator tubes and is helpful in minimizing losses of fat and fines.

Figure 6:
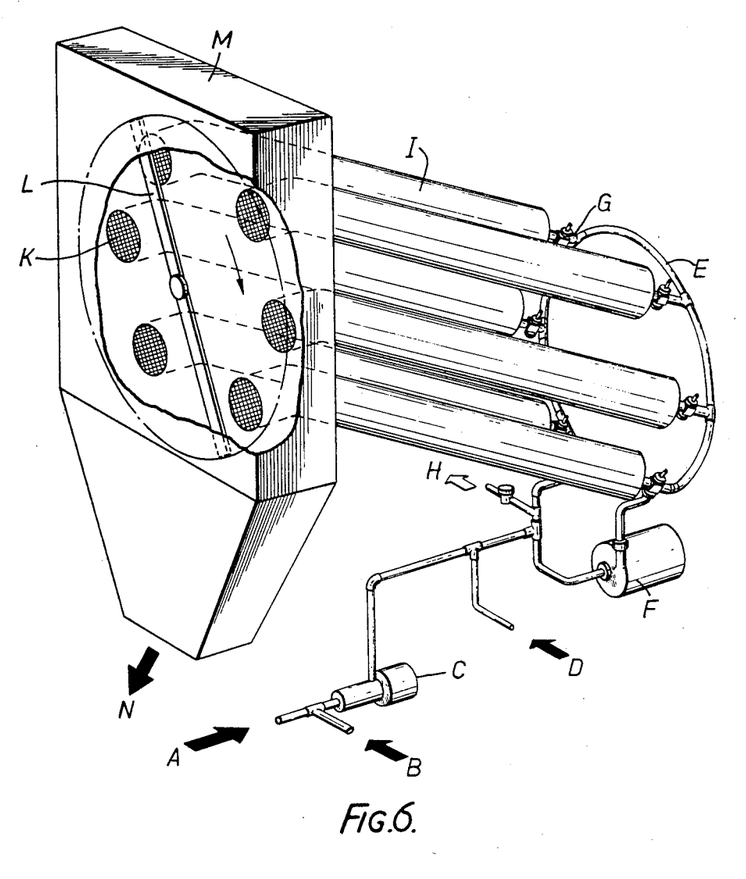

EXAMPLE 6 (FIG. 6)

Similar to Example 5 except for the 20° bend at the top of each tube. Bends of this type cause no significant disruption to coagulum structure, and are advantageous in that they allow transverse cutting to take place in a vertical plane. This is the optimum mode of cutting as it favours clearance of cut particles from its cutting region.

In FIG. 7, there is shown in more detail a pilot scale of one embodiment of the cutting means of the apparatus of FIG. 6. This comprises a driving motor (P) having an output shaft $P_1$ with a rotating disc (Q) connected to the distal end of the shaft $P_1$. Four posts (R) project towards cutting grids K. The four posts (R) are preferably aligned along a diameter of the rotating disc in pairs as illustrated such that there are two cutting blades (L). One blade (L) is supported by two of the posts located towards one side of the disc and the other blade (L) is supported by the other two posts located on the other side of the disc. The posts (R) are so shaped that cubic or cuboid particles cut from the coagulum are not damaged to any significant degree as they fall after being cut by blades (L) into delivery chute (S) immediately prior to entering the syneresis drum (not shown).

In FIG. 8, a pilot scale of one form of the cutting grid is shown comprising two stainless steel ribbons $T_1$, $T_2$. Each ribbon is anchored at each end to tensioning posts $U_1$, $U_2$ set in a support plate V. The ribbons $T_1$, $T_2$ pass around spacer pins $W_1$, $W_2$ also set in the plate V, to thus form spaced sets of knives which are crossed to form a grid. The tensioning posts $U_1$, $U_2$ are rotatable for adjusting the tension of the ribbons.

Those skilled in the art will appreciate that the invention described herein is susceptible to variations and modifications other than those specifically described. It is to be understood that the invention includes all such variations and modifications which fall within its spirit and scope.

I claim:

1. An apparatus suitable for the substantially continuous, at least in part, production of cheese curd from milk retentate, comprising at least two coagulator tubes, each tube having an inlet at one end for periodically receiving a ripened rennetted retentate and an outlet at the other end for discharging coagulum formed in the tube, said discharge of coagulum being effected by pressure applied periodically to, at or adjacent the inlet end; said inlet ends being connected to a feed system comprising a distribution means and a circulation means wherein said circulation means provides circulation of the retentate through the feed system under conditions whereby the retentate in the feed system is substantially free of coagulation and said distribution means includes control means for alternately periodically admitting the retentate into the respective inlets in timed sequence.

2. An apparatus according to claim 1 having a plurality, preferably six, substantially identical coagulator tubes arranged such that all of the respective inlet ends are connected to the distribution means.

3. An apparatus as claimed in claim 1 in which the feed system comprises a substantially endless loop of a substantially closed conduit means.

4. An apparatus as claimed in claim 3 in which part of the endless loop is a manifold means having a plurality of branches permitting periodical dispensing of the retentate to the respective coagulator tubes in sequence.

5. An apparatus as claimed in claim 1 in which the sequence is both chronological and spatial in which retentate is sequentially admitted to the respective spaced apart coagulator tubes in a regularly timed sequence.

6. An apparatus as claimed in claim 1 in which the control means for each of the plurality of coagulator tubes is a valve means connected to the manifold means intermediate the coagulator tube and the manifold means and arranged so that periodic operation of the valve means from a closed condition to an open condition in timed sequence permits admission of retentate to the plurality of coagulator tubes.

7. An apparatus as claimed in claim 6 in which the number of the valve means corresponds to the number of coagulator tubes.

8. An apparatus as claimed in claim 3 in which the distribution means further includes one or more retentate containing reservoirs, vessels or like chambers located in line in fluid communication with the endless loop, preferably such chamber(s) have both of its/their respective inlet(s) and outlet(s) in fluid communication with the endless loop so as to define a substantially continuous pathway.

9. An apparatus as claimed in claim 8 in which the circulation means comprises a pump which is located in line within the endless loop for circulating the retentate around and through the endless loop.

10. An apparatus as claimed in claim 6 which further includes a pump which provides the pressure at or adjacent the respective inlet end of the coagulator tube when the corresponding valve means is opened in use, required to admit retentate to the coagulator tubes and/or to discharge the coagulum from the coagulator tubes.

11. An apparatus as claimed in any one of the preceding claims in which the pump provides the pressure at or adjacent the respective inlet end of the coagulator tube when the corresponding valve means is opened in use, required to admit retentate to the coagulator tubes and/or to discharge the coagulum from the coagulator tubes.

12. An apparatus as claimed in claim 1 in which the incoming retentate admitted to each respective coagulator tube under pressure displaces the contents of the tube lengthwise along the tube so as to discharge coagulum from the respective outlets.

13. An apparatus as claimed in claim 12 in which the coagulator tubes are inclined at an angle, such as from 10°–50° to the horizontal, and optionally have an extension piece provided at the outlet ends, either collinear with an arranged to extend at an angle to the inclined coagulator tubes.

14. An apparatus as claimed in claim 1 in which there is a cutting assembly located at or adjacent the outlet or outlet ends for cutting the coagulum discharged from the coagulator tubes into appropriately sized particles, said cutting assembly comprising a first blade means spaced apart from a second blade means so as to define a rectilinear grid and a third blade means arranged so as to be capable of transverse movement across the coagulum for cutting the coagulum into cubes or cuboid shaped particles as or shortly after it emerges from the coagulator tubes in use.

15. An apparatus as claimed in claim 14 in which the length to diameter ratio of the coagulator tube or tubes is in the range of about 1 to 100, preferably 2 to 50, more preferably 4 to 20.

16. An apparatus as claimed in claim 14 in which the first and second blade means are relatively thin being about 0.01 mm thick and relatively wide being in the range of about 12 to 25 mm.

17. An apparatus as claimed in claim 14 in which the movable blade is about 1.6 mm thick and rotates at a speed of about 30 to 120 r.p.m.

* * * * *

UNITED STATES PATENT AND TRADEMARK OFFICE
CERTIFICATE OF CORRECTION

PATENT NO. : 4,756,243

DATED : July 12, 1988

INVENTOR(S) : David R. RADFORD et al.

It is certified that error appears in the above-identified patent and that said Letters Patent is hereby corrected as shown below:

ON THE TITLE PAGE:

Item [73], the name of the Assignee should be changed from "Commonwealth Scientific and Industrial Research Organization, Australia" to --Commonwealth of Australia--.

Signed and Sealed this

Fourteenth Day of March, 1989

Attest:

DONALD J. QUIGG

*Attesting Officer*  *Commissioner of Patents and Trademarks*